United States Patent
Wen (10) Patent No.: US 10,726,245 B2
(45) Date of Patent: Jul. 28, 2020

(54) SECURE FACIAL AUTHENTICATION SYSTEM USING ACTIVE INFRARED LIGHT SOURCE AND RGB-IR SENSOR

(71) Applicant: Black Sesame Technologies Inc., Santa Clara, CA (US)

(72) Inventor: Di Wen, San Jose, CA (US)

(73) Assignee: Black Sesame International Holding Limited, Santa Clara, CA (US)

( * ) Notice: Subject to any disclaimer, the term of this patent is extended or adjusted under 35 U.S.C. 154(b) by 203 days.

(21) Appl. No.: 15/926,773

(22) Filed: Mar. 20, 2018

(65) Prior Publication Data

US 2019/0180085 A1 Jun. 13, 2019

Related U.S. Application Data

(60) Provisional application No. 62/597,752, filed on Dec. 12, 2017.

(51) Int. Cl.
| | |
|---|---|
| *G06K 9/00* | (2006.01) |
| *G02B 5/20* | (2006.01) |
| *G06K 9/20* | (2006.01) |
| *G06K 9/46* | (2006.01) |

(52) U.S. Cl.
CPC ......... *G06K 9/00288* (2013.01); *G02B 5/208* (2013.01); *G06K 9/00228* (2013.01); *G06K 9/00241* (2013.01); *G06K 9/00268* (2013.01); *G06K 9/2018* (2013.01); *G06K 2009/4666* (2013.01)

(58) Field of Classification Search
CPC . G06K 9/00201–00295; G06K 9/2018; G06K 2009/4666; G02B 5/208
See application file for complete search history.

(56) References Cited

U.S. PATENT DOCUMENTS

| | | | | |
|---|---|---|---|---|
| 2010/0045788 A1* | 2/2010 | Zhang | ............... | G06K 9/00067 348/77 |
| 2013/0121584 A1* | 5/2013 | Bourdev | ............ | G06K 9/00281 382/190 |
| 2013/0243271 A1* | 9/2013 | Kawahara | .......... | G06K 9/00221 382/118 |
| 2013/0276007 A1* | 10/2013 | Li | .................... | H04N 21/44218 725/12 |
| 2013/0342702 A1* | 12/2013 | Zhang | ............... | G06K 9/00255 348/164 |
| 2014/0240477 A1* | 8/2014 | Feng | ..................... | H04N 5/217 348/77 |
| 2014/0337948 A1* | 11/2014 | Hoyos | .................... | G07F 19/20 726/7 |

(Continued)

*Primary Examiner* — Sean T Motsinger
(74) *Attorney, Agent, or Firm* — Timothy T. Wang; Ni, Wang & Massand, PLLC (57) ABSTRACT

An infrared face authentication system and method, having an infrared lamp, a camera having at least infrared responsive pixels proximate to the infrared lamp and a processor connected to the infrared lamp and camera, wherein the infrared lamp and camera are responsive to the processor, wherein the processor receives a facial image from the camera illuminated by the infrared lamp and determines whether the facial image is comprised of epidermis and if the facial image is comprised of epidermis whether the facial image matches an enrolled facial image and if the facial image matches the enrolled facial image an authentication is output.

6 Claims, 5 Drawing Sheets

(56) References Cited

U.S. PATENT DOCUMENTS

| | | | |
|---|---|---|---|
| 2016/0057138 A1* | 2/2016 | Hoyos | G06T 7/73 |
| | | | 726/7 |
| 2016/0140390 A1* | 5/2016 | Ghosh | G06K 9/00597 |
| | | | 348/78 |
| 2016/0335483 A1* | 11/2016 | Pfursich | G06K 9/00899 |
| 2017/0098119 A1* | 4/2017 | Gope | G06K 9/00281 |
| 2017/0169304 A1* | 6/2017 | Jia | G06K 9/00906 |
| 2017/0323167 A1* | 11/2017 | Mapen | G06K 9/00604 |
| 2018/0247146 A1* | 8/2018 | Riddle | G06K 9/2027 |
| 2018/0285668 A1* | 10/2018 | Li | G06K 9/00899 |
| 2019/0005217 A1* | 1/2019 | Kim | G06F 21/32 |
| 2019/0057270 A1* | 2/2019 | Heo | G06K 9/00597 |
| 2019/0147676 A1* | 5/2019 | Madzhunkov | G06K 9/00255 |
| | | | 340/5.2 |
| 2019/0180085 A1* | 6/2019 | Wen | G06K 9/00241 |
| 2019/0212125 A1* | 7/2019 | Deleule | G01S 17/88 |
| 2019/0213309 A1* | 7/2019 | Morestin | G01S 17/89 |
| 2019/0251334 A1* | 8/2019 | Kawase | G06K 9/00268 |
| 2019/0251380 A1* | 8/2019 | Park | G06K 9/6289 |
| 2019/0272443 A1* | 9/2019 | Goenka | G06F 16/58 |
| 2019/0335098 A1* | 10/2019 | Guo | G06K 9/00288 |
| 2019/0354746 A1* | 11/2019 | Zhang | G06K 9/00248 |

* cited by examiner

SECURE FACIAL AUTHENTICATION SYSTEM USING ACTIVE INFRARED LIGHT SOURCE AND RGB-IR SENSOR

BACKGROUND

Technical Field

The instant disclosure may be applicable to secure facial authentication for cell phones, computers and the like.

Background

Currently, facial biometric authentication may be spoofed by several means including but not limited to a printed photo, a two dimensional mask, a three dimensional mask, replayed video on a mobile screen or a displayed photo on a mobile screen.

What is sought is a form of facial biometric identification that is difficult to spoof. One possible solution is the use of an infrared photo, illuminated by an infrared source. This type of solution easily detects the non-uniformity of a reflected infrared light on a flat surface such as a printed photo, replayed video or mobile displayed photo. Additionally, the infrared would allow identification of two dimensional or three dimensional masks as not being comprised of epidermis.

SUMMARY

In one embodiment an infrared face authentication system, having an infrared lamp, a camera having visible color responsive pixels and infrared responsive pixels proximate to the infrared lamp and a processor connected to the infrared lamp and camera, wherein the infrared lamp and camera are responsive to the processor, wherein the processor receives a facial image illuminated by the infrared lamp and determines whether the facial image is comprised of epidermis and if the facial image is comprised of epidermis whether the facial image matches an enrolled facial image and if the facial image is comprised of epidermis and matches the enrolled facial image an authentication is output. In some cases, the camera can include a filter to let pass selective infrared spectrum and have only infrared responsive pixels if visible color image is not needed.

In another embodiment a method of infrared face authentication, having illuminating in an infrared spectrum, capturing a facial image in the infrared spectrum, determining whether the captured facial image is approximately uniformly illuminated, scoring the approximate uniform illumination as a liveness confidence, determining a captured facial signature vector of the captured facial image, scoring a facial matching similarity of the captured facial signature vector to a stored enrolled facial signature vector of an enrolled facial image and authenticating the captured facial signature vector if it is above a predetermined threshold of the scored facial matching similarity.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does nut intend to distinguish between components and/or methods that differ in name but not in function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

The SEFA system may verify a user's identity by comparing his/her face with faces of authorized users, called a face login process (FLP).

The SEFA system may provide a secure anti-spoofing functionality, which may reject face spoofing attacks launched by imposters using attacking medium made to replicate a target subject's facial images.

Figure 1:
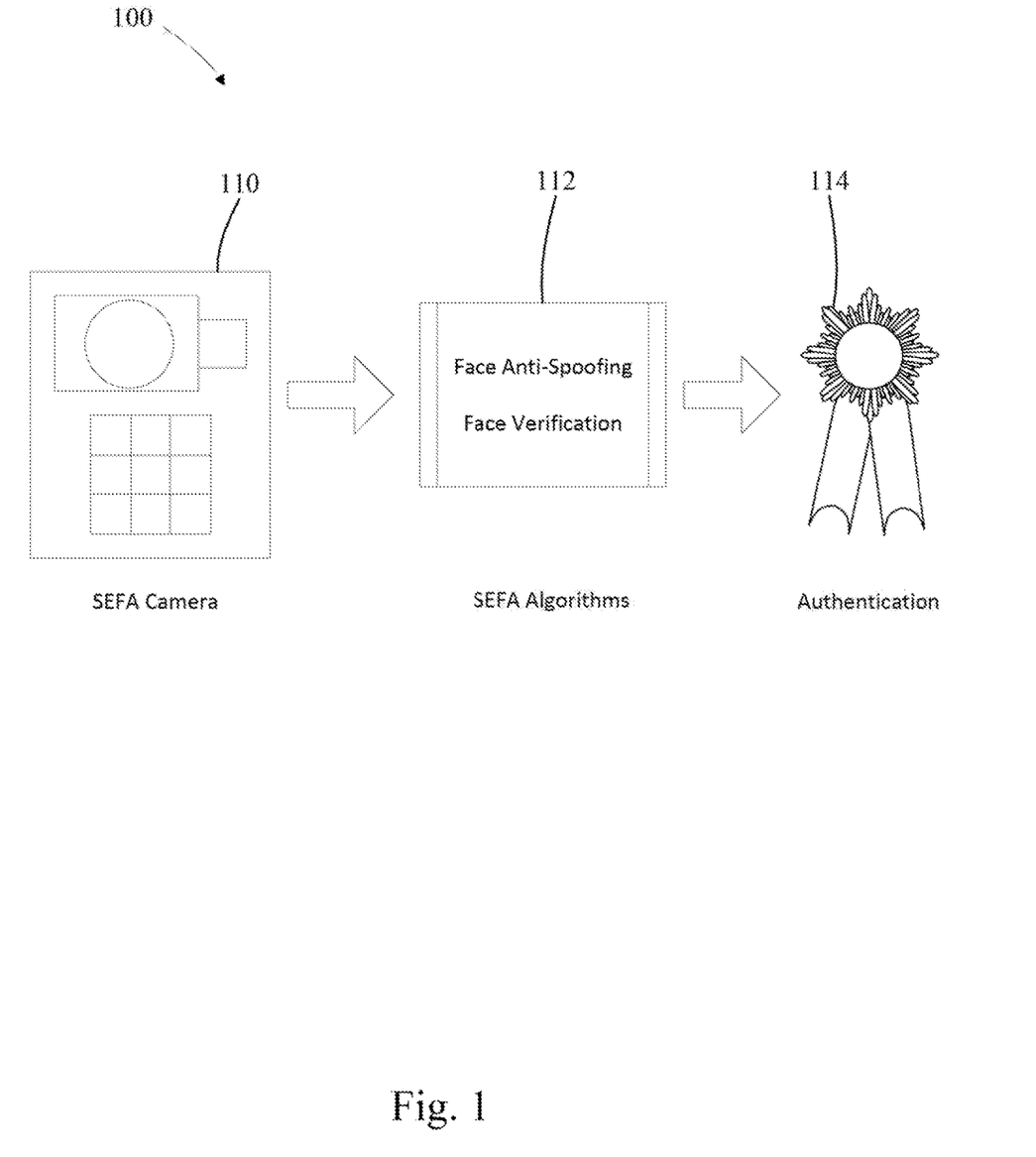
FIG. 1 is an overall diagram in accordance with one embodiment of the disclosure.

The SEFA system is comprised of several parts, FIG. 1, a SEFA camera 110 having active IR lighting, a SEFA algorithm 112 and data and control transmission 114 running on a processor.

Figure 2:
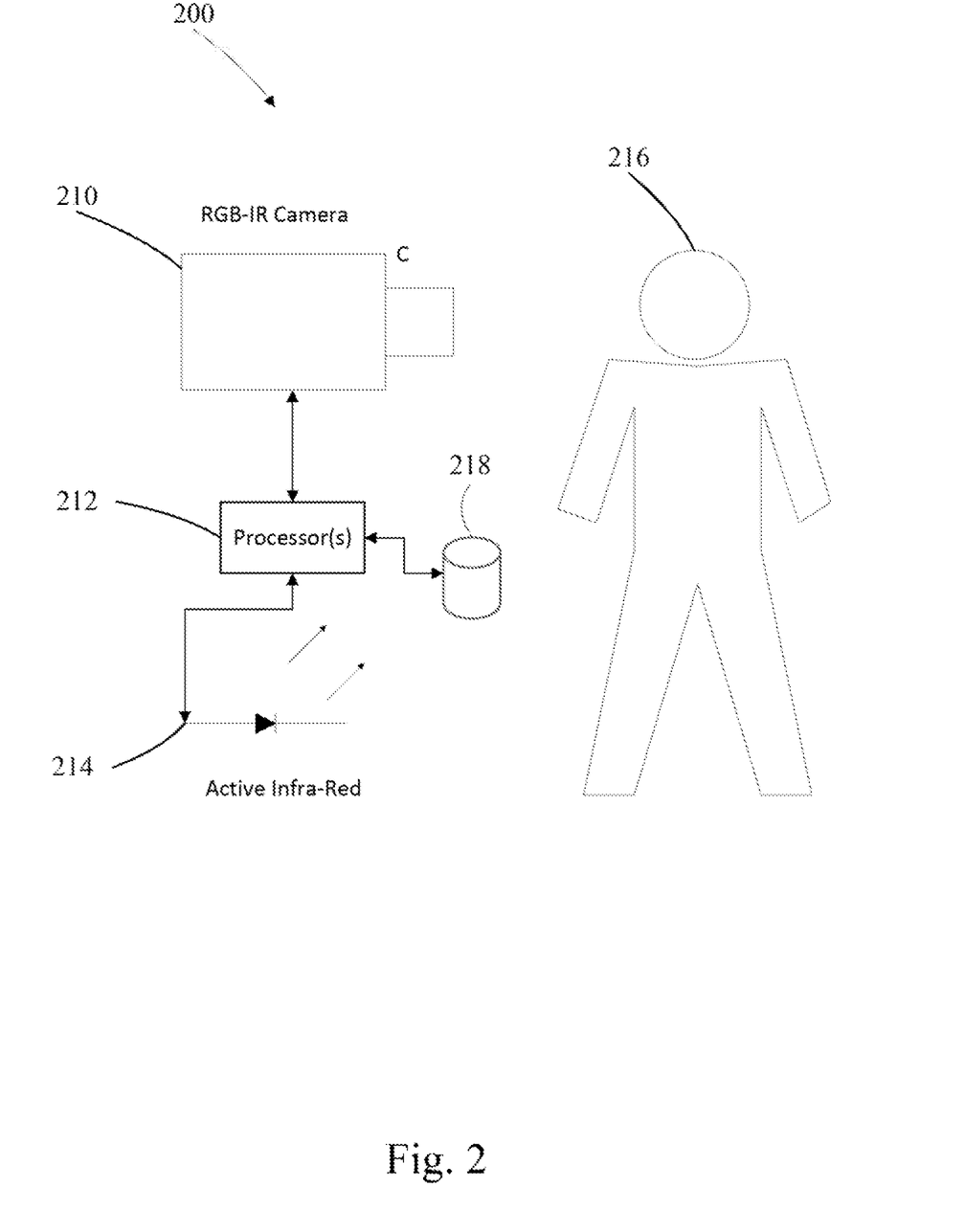
FIG. 2 is a system diagram in accordance with one embodiment of the disclosure.

The SEFA camera FIG. 2, includes an active infra-red light source 214 with single or multiple IR emitters at specific wavelength spectrums (e.g., 94 nm, 850 nm, 910 nm, 1100 nm and the like) and an RGB-IR camera module 210 or an IR camera module in communication with a processor(s) 212 to take an IR photo of a face object 216. The processor(s) 212 is coupled to a memory 218.

The SEFA algorithm includes a Face Anti-Spoofing (FAS) algorithm and a Face Verification (VF) algorithm.

An infrared light uniformly illuminates live faces of epidermis, but not spoof faces which are displayed on flat surfaces, curved surfaces or surfaces made of non-epidermis materials. Under these circumstances, spoof faces look quite different from live faces in the IR spectrum. The SEFA algorithm continuously detects and responds to face login requests from live faces and neglects spoof faces.

The system captures an image frame from a camera. In this example an RGB-IR camera, which is comprised of four-channel (R, G, B, IR) sensors. In IR camera examples, this would entail a single IR channel image.

If no face object is initialized, the system conducts face detection in the IR channel and initializes a face object. If there is an initialized face object, the system conducts face tracking in the IR channel.

When a trace object is detected m the IR channel, the FAS algorithm calculates a liveness confidence (LC) value (from 0 to 1), where LC=0 indicates a spoofed face and LC=1 indicates a live face. The liveness confidence is a scoring of the IR reflection of the face object to determine if the reflection is indicative of epidermis.

A multi-frame average LC of the face is determined, If the LC is greater than a specific threshold, facial verification is begun, otherwise, the face is rejected as a spoof face and the facial object is removed.

The FAS algorithm may work on a single image frame to detect a face and output the liveness confidence (LC) of the face.

The FV algorithm receives the input R, G, B and IR images and generates a face signature vector (FSV), that is compared to an FSV stored in a library in memory to output a face matching similarity score (ranging from 0 to 1) indicating the similarity of the login face with the target face in the library.

If the score is greater than a matching threshold, the current face is accepted as an authorized user and the system will be unlocked. Otherwise, the FV process fails and the face object is removed.

In the IR channel, a normalized face image, I_norm, is determined after an alignment of features with detected facial landmarks.

Local binary pattern (LBP) features, f_LBP, are extracted from I_norm, including multiple LBP channels, constituting in one example a 479-dimensional feature vector.

A convolving of I_norm with a Difference of Gaussian (DoG) filter is performed and the 479-dimensional LBP features from the filtered image are extracted. The DoG filter may improve the robustness of LBP features. Multiple methods to calculate DoG image may be utilized. In one example, s1=0.5 and s2=2 and in another example s1=1 and s2=4. In both, a 479 dimensional LBP feature is extracted for that example.

A resultant LBP has features that are then concatenated into a whole feature vector and sent to a classifier to output the liveness confidence (LC), with LC=0 indicating a spoofed face and LC=1 indicating a live face.

The FAS algorithm may work with multiple frames having detected faces. The FAS algorithm may calculate the LC for each frame and output the average LC.

The time delay for FAS to output LC after N input frames may be calculated as:

$$TD\_FAS=N*tFAS$$

Where N is the number of frames FAS needs to make a decision and tFAS is the time consumption of FAS in one frame. As an example, for N=10 and tFAS=20 ms, TD_FAS may be easily controlled to 0.2 s.

The FV algorithm converts an input four-channel RGB-IR image to a single channel image and a normalized face image I_norm after face alignment on detected landmarks. A determination of I_norm is performed to determine a face signature vector (FSV).

The similarity score (Sc) between the FSV of the login face and that of the authenticated user in the library is determined where Sc=Dist(FSV_login, FSV_library), Dist( ) is a pre-defined distance function of two vectors of the same length, such as the Cosine distance function: Dist(x,y)=<x,y>/(|x|*|y) and login is accepted in the case that Sc is greater than a predetermined threshold.

The infrared face authentication system may be implemented in any electronics device for authentication such as an automated teller machine. In one example the system may be implemented in a mobile device such as a cellular phone, notebook computer or tablet computer to allow access to the device. In one embodiment of an infrared face authentication the system has an infrared lamp 214 and a camera 210 has visible color responsive pixels and infrared responsive pixels proximate to the infrared lamp. The infrared lamp may be comprised of one or more IR light emitting diodes. The IR responsive pixels may be part of an RGB-IR camera for a separate IR camera. A processor(s) 212 is connected to and controls the infrared lamp and camera. The processor may be a digital signal processor, the enrolled facial image may be encrypted and the system may be contained in a smart phone or the like. The processor receives a facial image from the IR pixels of the camera which are illuminated by the infrared lamp and determines whether the facial image is comprised of epidermis. If the facial image is comprised of epidermis and matches an enrolled facial image an authentication is output. The enrolled facial image may be stored locally 218, as in the case of mobile products, or stored in a centralized database as in the case of the automated teller machine.

Figure 3:
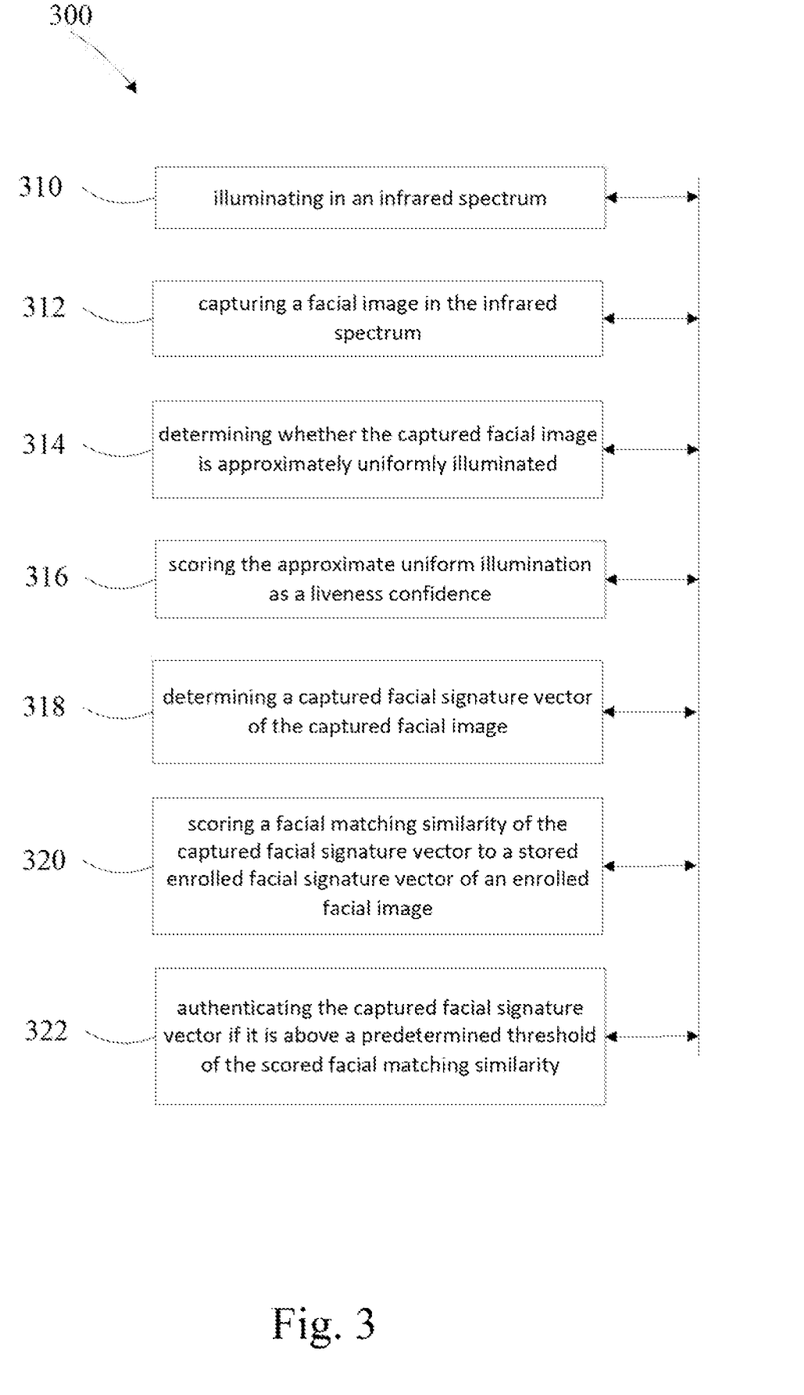
FIG. 3 is an illustration of a method in accordance with one embodiment of the disclosure.

In another embodiment a method of infrared face authentication shown in FIG. 3. The method includes illuminating 310 in an infrared spectrum and capturing 312 a facial image in the infrared spectrum. The captured image may be stored locally or remotely in a database. The method further includes determining 314 whether the captured facial image is approximately uniformly illuminated and scoring 316 the approximate uniform illumination as a liveness confidence indicative of an epidermal response. The method also includes determining 318 a captured facial signature vector of the captured facial image and scoring 320 a facial matching similarity of the captured facial signature vector to a stored enrolled facial signature vector of an enrolled facial image. The enrolled facial image may be stored locally or remotely. If the scored facial matching similarity is above a predetermined threshold then the method authenticates 322 the captured facial signature vector.

Figure 4:
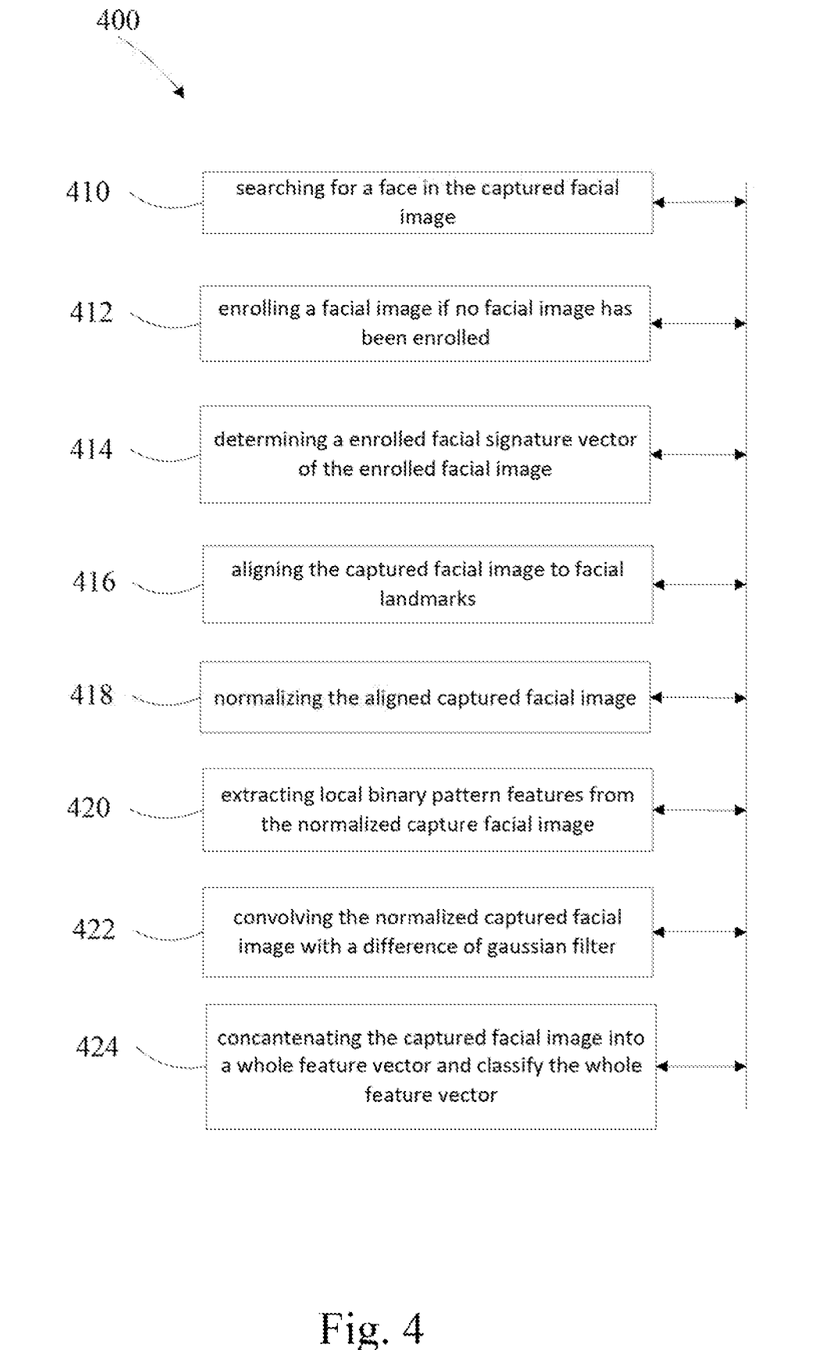
FIG. 4 is an illustration of additional methods in accordance with one embodiment of the disclosure.

The method may further include searching 410 for a face in a captured facial image as shown in FIG. 4. The method may further include enrolling 412 a captured facial image and determining 414 an enrolled facial signature vector of the enrolled facial image. The method may also include aligning 416 the captured facial image to facial landmarks to ease identification and then normalizing 418 the aligned captured facial image. The method may also include extracting 420 local binary pattern features from the normalized capture facial image, convolving 422 the normalized captured facial image with a difference of Gaussian filter and concatenating 424 the captured facial image into a whole feature vector and classifying the whole feature vector. If no face has been enrolled and a facial image is located, the system enrolls a facial image and determines an enrolled facial signature vector of the enrolled facial image.

Figure 5:
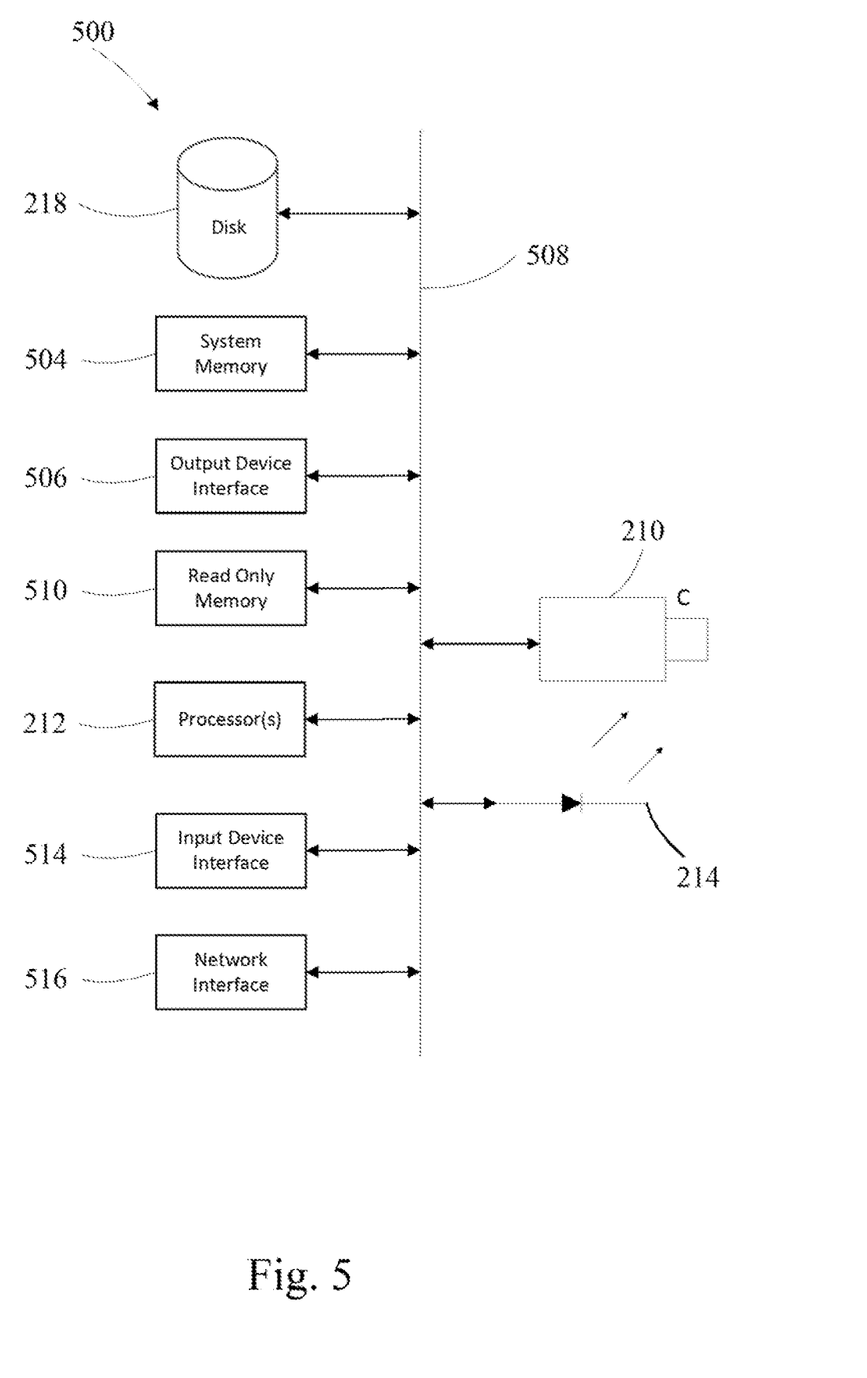
FIG. 5 is a second system diagram in accordance with one embodiment of the disclosure.

FIG. 5 depicts an example electronic system for use in connection with a stationary example, such as an ATM, of the infrared facial recognition system. Electronic system 500 may be a computing device for execution of software associated with the operation of one or more portions or steps of process 100, 200, 300 or 400, or components and processes provided by FIGS. 1-4. Electronic system 500 may be a personal computer or a mobile device such as a tablet computer, laptop, smart phone, PDA, or other touch screen or television with one or more processors embedded therein or coupled thereto, or any other sort of computer-related electronic device having wireless connectivity.

Electronic system 500 may include various types of computer readable media and interfaces for various other types of computer readable media. In the depicted example, electronic system 500 includes a bus 508, processor(s) 212, a system memory 504, a read-only memory (ROM) 510, a permanent storage device 218, an input device interface 514, an output device interface 506, and one or more network interfaces 516. In same implementations, electronic system 500 may include or be integrated with other computing devices or circuitry for operation of the various components and processes previously described. In one embodiment of the present disclosure the processor(s) 212 is coupled through the bus 508 to the RGB-IR camera 210 and the active infrared lamp 214.

Bus 508 collectively represents all system, peripheral, and chipset buses that communicatively connect the numerous internal devices of electronic system 500. For instance, bus 508 communicatively connects processor(s) 212 with ROM 510, system memory 504, permanent storage device 218, RGB-IR camera 210 and the active infrared lamp 214.

From these various memory units, processor(s) 212 retrieves instructions to execute and data to process in order to execute the processes of the subject disclosure. The processing unit(s) can be a single processor or a multi-core processor in different implementations.

ROM 510 stores static data and instructions that are needed by processor(s) 212 and other modules of the electronic system. Permanent storage device 218, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 218.

Other implementations use a removable storage device (such as a floppy disk, flash drive, and its corresponding disk drive) as permanent storage device 218. Like permanent storage device 218, system memory 504 is a read-and-write memory device. However, unlike storage device 218, system memory 504 is a volatile read-and-write memory, such at random access memory. System memory 504 stores some of the instructions and data that the processor needs at runtime. In some implementations, the processes of the subject disclosure are stored in system memory 504, permanent storage device 218, and/or ROM 510. From these various memory units, processor(s) 212 retrieves instructions to execute and data to process in order to execute the processes of some implementations.

Bus 508 also connects to input and output device interfaces 514 and 506, Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through network interfaces 516. Network interfaces 516 may include, for example, a wireless access point (e.g., Bluetooth or WiFi) or radio circuitry for connecting to a wireless access point. Network interfaces 516 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any of all components of electronic system 500 can be used in conjunction with the subject disclosure.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including, acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, to components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment, in conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of infrared face authentication, comprising:
    illuminating in an infrared spectrum;
    capturing a facial image in the infrared spectrum;
    determining whether the captured facial image is approximately uniformly illuminated;
    scoring the approximate uniform illumination as a liveness confidence;
    determining a captured facial signature vector of the captured facial image;
    scoring a facial matching similarity of the captured facial, signature vector to a stored enrolled facial signature vector of an enrolled facial image;
    authenticating the captured facial signature vector if it is above a predetermined threshold of the scored facial matching similarity;
    aligning the captured facial image to facial landmarks;
    normalizing the aligned captured facial image;
    extracting local binary pattern features from the normalized capture facial image;
    convolving the normalized captured facial image with a difference of Gaussian filter;
    concatenating the captured facial image into a whole feature vector; and
    classifying the whole feature vector.

2. The method of infrared face authentication of claim 1, further comprising searching for a face in the captured facial image.

3. The method of infrared face authentication of claim 1, further comprising enrolling a facial image if no facial image has been enrolled.

4. The method of infrared face authentication of claim 3, further comprising determining a enrolled facial signature vector of the enrolled facial image.

5. The method of infrared face authentication of claim 1, wherein the scoring of the facial matching similarity is between 0 and 1.

6. The method of infrared face authentication of claim 1, wherein the captured facial image is one frame.

* * * * *